Figure 1:
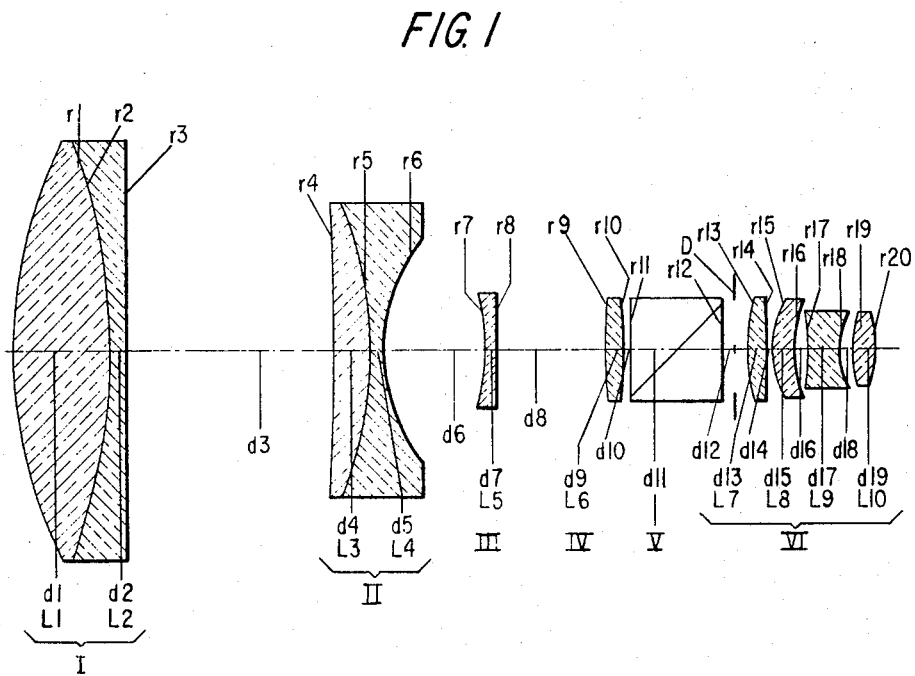

Sept. 20, 1966    K. MACHER ET AL    3,273,457
OBJECTIVE SYSTEM COMPRISING A PRINCIPAL OBJECTIVE
AND A FOUR-COMPONENT ATTACHMENT
Filed May 12, 1964    2 Sheets-Sheet 2

KARL MACHER
RUDOLF SOLISCH
WALTER WÖLTCHE
    Inventors.

Karl J. Ross
    AGENT

United States Patent Office 3,273,457
Patented Sept. 20, 1966

---

3,273,457
OBJECTIVE SYSTEM COMPRISING A PRINCIPAL OBJECTIVE AND A FOUR-COMPONENT ATTACHMENT
Karl Macher, Bad Kreuznach, Rudolf Solisch, Gottingen, and Walter Wöltche, Bad Kreuznach, Germany, assignors to Josef Schneider & Co., Optische Werke, Bad Kreuznach, Rhineland, Germany
Filed May 12, 1964, Ser. No. 366,878
Claims priority, application Germany, May 14, 1963, Sch 33,278
11 Claims. (Cl. 88—57)

This application is a continuation-in-part of our copending application Ser. No. 209,866, filed July 16, 1962, now abandoned.

The present invention relates to varifocal objectives of the type comprising a multilens basic objective and a four-component front attachment therefor, with two stationary and positively refracting outer lens members (of which the more forward one may be limitedly displaceable for focusing purposes) bracketing two movable and negatively refracting inner lens members, as disclosed in commonly assigned application Ser. No. 159,392 filed November 14, 1961, by Rudolf Solisch and Walter Wöltche, and now abandoned.

Heretofore a varifocal objective of this type has been realizable with aperture ratios up to approximately 1:2.8 and varifocal ratios of about 1:3.3. The general object of this invention is to improve both ratios.

A more specific object of the instant invention is to provide a varifocal objective of this character which can be opened up to a relative aperture of about 1:1.8 and whose effective focal length can be varied in the range of at least 1:4, with high-quality optical performance particularly in the region of the shorter focal lengths (wide-angle range) and with compact design.

A further, more particular object of our present invention is to provide an objective in which the aforestated desiderata are fulfilled and wherein, at the same time, the displacement stroke of the movable negative components is reduced in comparison with the arrangement disclosed in our aforementioned application Ser. No. 209,866, now abandoned, whereby the total axial length of the system is decreased and, in addition, the position of the entrance pupil will be shifted to allow for the use of lenses of smaller diameter for the first two object-side components.

A feature of the objective to which the present invention pertains, as disclosed in our copending application, is that the second component of the attachment as seen from the object side of the system, i.e., the more forward one of the axially movable negative components, is of higher power than the remaining components of the attachment and, in particular, has an individual focal length which is less than twice the focal length of the basic objective associated with the attachment; the latter focal length is generally equal to the mean focal length of the entire system.

According to another feature of such objective, designed to afford particularly good correction of chromatic aberrations over the entire varifocal range, the first two components of the attachment are doublets with strongly refractive cemented surfaces. In particular it has been found advantageous to make the cemented surface of the first movable component (i.e., the second component of the attachment) positively refracting with a radius whose absolute magnitude is less than 2.5 times that of the radius of the concave rear face of this movable component while at the same time the cemented surface of the first stationary component, i.e., the front component of the attachment, has a radius whose absolute magnitude is less than 1.5 times that of the radius of the convex forward face of this front component.

A further feature of the objective referred to involves the construction of the associated basic objective which in accordance with this improvement has two image-side components of opposite refractivity whose mutual separation is less than 50% of the axial thickness of the negative one of these components. This arangement enables not only a very compact construction of the basic objective but also, by virtue of the relatively thick lens member, a favorable control of spheric and comatic aberrations.

In accordance with out instant invention, the absolute values of the focal lengths $f_\mathrm{I}'$, $f_\mathrm{III}'$ and $f_\mathrm{IV}'$ of the first, third and fourth lens members of the system (as seen from the object side) substantially satisfy the relationship:

$$0.3|f_\mathrm{I}'|<3(|f_\mathrm{III}'|-|f_\mathrm{IV}'|)<1.3|f_\mathrm{I}'| \qquad (1)$$

The reduced displacement stroke realized by virtue of the above feature enables the objective to be so constructed, if this should be desired for the purpose of more convenient mounting, that the negatively refracting third component is stationary whereas the positively refracting fourth component, i.e., the last member of the attachment, is movable to a limited extent.

In order to achieve good chromatic correction and maximum elimination of distortion, still another feature of the invention lies in dimensioning the first two radii $r1'$, $r2'$ of the compound front member in accordance with the relationship $$+1.2r1'\geqq -r2' \qquad (2)$$

these two radii defining the more forwardly positioned positive lens of this doublet whose refractive index for the yellow $d$ line of the spectrum should be greater than substantially 1.65.

It is furthermore desirable, for a favorable correction of spherical aberration and suppression of astigmatism, to constitute the negatively refracting second component from two lens members, including a doublet preceding a singlet, and to proportion the radii of curvature $r7$ and $r8$ of that singlet according to the relationship $$10r8'\geqq -r7' \qquad (3)$$

Figure 2:
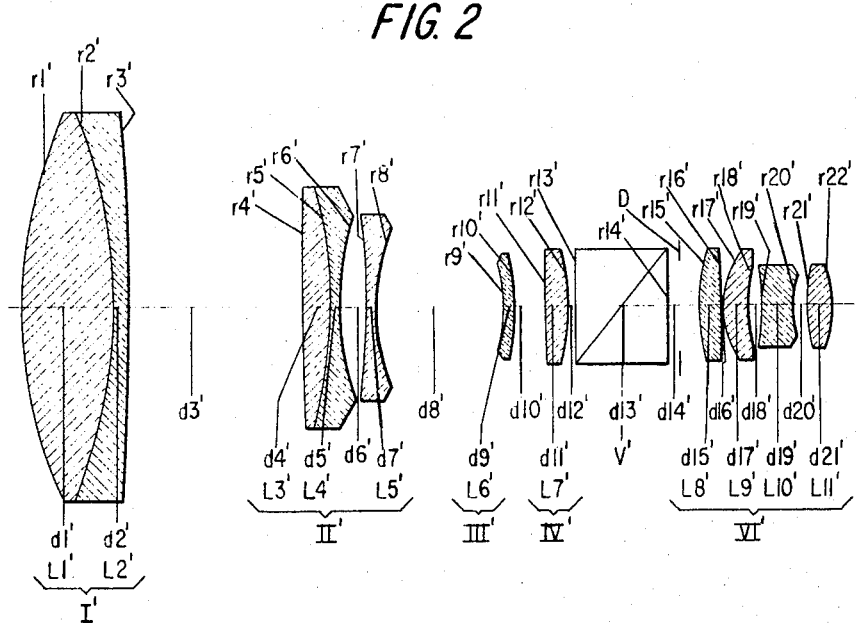

In the accompanying drawing:

FIG. 1 illustrates a varifocal objective as disclosed in our prior application Ser. No. 209,866, now abandoned; and FIG. 2 shows a similar objective incorporating the present improvement.

The objective shown in FIG. 1 comprises a varifocal attachment, constituted by four air-spaced components I–IV, and a basic or principal objective VI. Component I is a doublet composed of a positive lens L1, with radii $r1$, $r2$ and thickness $d1$, which is cemented onto a negative lens L2 having radii $r2$, $r3$ and thickness $d2$. Component II, separated from component I by a variable air space $d3$, is likewise a doublet consisting of a positive lens L3 (with radii $r4$, $r5$ and thickness $d4$) and a negative lens L4 (with radii $r5$, $r6$ and thickness $d5$) cemented to it. Another variable air space $d6$ intervenes between this movable member and the next likewise movable component III which is a single lens L5 with radii $r7$, $r8$ and thickness $d7$. The last component IV of the attachment, which follows component III by a further variable air space $d8$, is a positive singlet L6 with radii $r9$, $r10$ and thickness $d9$. The large air space between the attachment I–IV and the principal objective VI is partly occupied by a prism V of axial width $d11$, which is bounded by flat surfaces designated $r11$ and $r12$, separated from lens L6 by a small air space $d10$ and from the fixed lens group VI by a larger air space $d12$ accommodating a diaphragm D. The basic objective VI consists of four air-spaced singlets including a positive lens L7 with radii r13, r14 and thickness d13, another positive lens L8 (radii r15, r16 and thickness d15) separated from the lens L7 by an air space d14, a negative third lens L9 with radii r17, r18 and a relatively great axial thickness d17, this lens being separated from lens L8 by the air space d16, and finally a positive fourth lens L10 (radii r19, r20 and thickness d19) whose separation d18 from the preceding lens L9 is less than half the thickness d17 of the latter.

The following Table A lists representative values for the individual focal lengths $f$ of the components I, II, III, IV and VI, the radii r1 to r20 and the thicknesses and separations d1 to d19 (based upon a numerical value of 100 for the mean focal length of the system), the refractive indices $n_d$ of the lenses L1 to L10 and their Abbé numbers $v$, the system so defined having an aperture ratio of 1:1.8, a back-focal length of 58.1 and a varifocal range from 50 to 200 units (i.e., millimeters).

composed of lenses L1', L2' (similar to lenses L1 and L2 of FIG. 1) with radii r1'–r3' and thicknesses d1'–d2', Component II', separated from component I' by a variable air space d3', comprises a doublet L3', L4' with radii r4'–r6' and thicknesses d4'–d5', similar to the lenses L3 and L4 of component II in FIG. 1, and a biconcave singlet L5' (radii r7', r8', thickness d7') separated from that doublet by an air space d6'. Another variable air space d8' intervenes between singlet L5' and the second negative component III' which, similarly to component III of FIG. 1, is a singlet with radii r9', r10' and thickness d9'. A further variable air space d10' separates lens L7' from the fourth component IV' again consisting of a single positive lens L7' with radii r12', r13' and thickness d11'. The air space d12' between member L7' and prism V' may be fixed or variable, depending on whether component III' or component IV'

TABLE A

| Individual Focal Lengths | Lens | | Radii | Thicknesses and Separations | $n_d$ | $v$ |
|---|---|---|---|---|---|---|
| ($f_I$) +478.1 | I | L1 | r1 = +275.13 | d1 = 58.75 | 1.61772 | 49.78 |
| | | L2 | r2 = −355.69 | d2 = 8.75 | 1.76180 | 26.98 |
| | | | r3 = −3212.50 | d3 = 127.19 | Variable air space | |
| ($f_{II}$) −175.7 | II | L3 | r4 = −1821.25 | d4 = 22.50 | 1.80518 | 25.46 |
| | | L4 | r5 = −217.00 | d5 = 7.50 | 1.62041 | 60.29 |
| | | | r6 = +102.06 | d6 = 61.00 | Variable air space | |
| ($f_{III}$) −241.9 | III | L5 | r7 = −142.56 | d7 = 6.25 | 1.62004 | 36.34 |
| | | | r8 = −3618.75 | d8 = 66.25 | Variable air space | |
| ($f_{IV}$) +236.6 | IV | L6 | r9 = +275.63 | d9 = 12.50 | 1.52015 | 63.59 |
| | | | r10 = −220.31 | d10 = 3.13 | Air space | |
| | V | | r11 = ∞ | d11 = 55.00 | 1.51680 | 64.20 |
| | | | r12 = ∞ | d12 = 15.63 | Air space | |
| | | L7 | r13 = +124.00 | d13 = 13.75 | 1.67790 | 55.52 |
| | | | r14 = −473.63 | d14 = 0.25 | Air space | |
| | | L8 | r15 = +56.31 | d15 = 14.88 | 1.69680 | 55.61 |
| | | | r16 = +85.50 | d16 = 7.50 | Air space | |
| ($f_{VI}$) +101.4 | VI | L9 | r17 = −177.50 | d17 = 19.69 | 1.78470 | 26.10 |
| | | | r18 = +46.84 | d18 = 8.13 | Air space | |
| | | L10 | r19 = +93.00 | d19 = 14.38 | 1.74400 | 44.90 |
| | | | r20 = −71.94 | | | |
| | | | | $d_{total}$ = 522.93 | | |

The variation of the air spaces d3, d6 and d8 for the realization of different overall focal lengths $f$ will be apparent from the following Table B:

TABLE B

| $f$ | d3 | d6 | d8 |
|---|---|---|---|
| 50 | 6.15 | 180.15 | 68.14 |
| 100 | 127.19 | 61.00 | 66.25 |
| 200 | 214.52 | 12.90 | 27.02 |

The system shown in FIG. 2 is generally similar to that of FIG. 1 and consists of components I'–IV', a prism V' and a basic objective VI'. Component I' is a doublet is movable to compensate for the shifting of the image plane due to the displacement of component II'. The remaining radii r13'–r22' and spacings or thicknesses d13'–d21' correspond substantially to the radii r11–r20 and thicknesses or separation d11–d19 of the system of FIG. 1 whose basic objective VI is similar to the objective VI' of FIG. 2.

Representative values of the parameters r1'–r22' and d1'–d21', the individual focal lengths $f'$ of components I'–IV' and VI' and their refractive indices and Abbé numbers of the system of FIG. 2 are listed in the following Table C, the aperture ratio being again 1:1.8 and the varifocal range remaining at 50 to 200 units; the back-focal length is 58.25.

TABLE C

| Individual Focal Lengths | Lens | | Radii | Thicknesses and Separations | $n_d$ | $\nu$ |
|---|---|---|---|---|---|---|
| ($f_I'$) +419.0 | I' | L1' | r1' = +275.13 | d1' = 54.38 | 1.66672 | 48.38 |
| | | L2' | r2' = −303.25 | d2' = 8.75 | 1.80518 | 25.46 |
| | | | r3' = −1926.25 | d3' = 107.18 | Variable air space | |
| ($f_{II}'$) −112.5 | II' | L3' | r4' = +3312.50 | d4' = 16.88 | 1.80518 | 25.46 |
| | | L4' | r5' = −241.75 | d5' = 5.94 | 1.58913 | 61.24 |
| | | | r6' = +169.06 | d6' = 14.38 | Air space | |
| | | L5' | r7' = −531.88 | d7' = 6.25 | 1.60311 | 60.68 |
| | | | r8' = +116.50 | d8' = 77.31 | Variable air space | |
| ($f_{III}'$) −273.9 | III' | L6' | r9' = −76.69 | d9' = 6.25 | 1.63636 | 35.35 |
| | | | r10' = −140.56 | d10' = 20.20 | Variable air space | |
| ($f_{IV}'$) +174.4 | IV' | L7' | r11' = +625.25 | d11' = 12.50 | 1.62230 | 53.14 |
| | | | r12' = −131.06 | d12' = 16.12 | Fixed or variable air space | |
| | V' | | r13' = ∞ | d13' = 37.50 | 1.51680 | 64.20 |
| | | | r14' = ∞ | d14' = 18.94 | Air space | |
| ($f_{VI}'$) +102.1 | VI' | L8' | r15' = +121.19 | d15' = 13.75 | 1.67790 | 55.52 |
| | | | r16' = −518.63 | d16' = 0.25 | Air space | |
| | | L9' | r17' = +56.31 | d17' = 14.88 | 1.69350 | 53.39 |
| | | | r18' = +86.38 | d18' = 7.50 | Air space | |
| | | L10' | r19' = −186.81 | d19' = 19.69 | 1.80518 | 25.46 |
| | | | r20' = +47.66 | d20' = 8.13 | Air space | |
| | | L11' | r21' = +93.00 | d21' = 14.38 | 1.74400 | 44.90 |
| | | | r22' = −73.00 | | | |
| | | | | $d_{total}$ = 481.16 | | |

The system of FIG. 2, in common with that of FIG. 1, has a nearly plano-convex collective front component with a forwardly concave cemented surface (r2 or r2') of strong negative refractivity and a second component which includes a dispersive doublet with a forwardly concave cemented surface (r5 or r5') of strong positive refractivity, the first-mentioned internal radius having an absolute magnitude which is less than 1.5 times that of the radius (r1 or r1') of the front surface of the first component whereas the second internal radius has an absolute magnitude less than 2.5 times that of the radius (r6 or r6') of the concave rear face of the dispersive doublet. Furthermore, the focal length $f_{II}$ or $f_{II}'$ of the second component is less than twice the focal length of the basic objective VI' which in turn equals substantially the mean overall focal length of the system. The objective system of FIG. 2, in particular, satisfies the Relationships 1, 2 and 3 set forth above.

Table D, below, gives the variations of the air spaces d3', d8' and d10' for different values of the overall focal length f' if member IV' is held stationary.

TABLE D

| f' | d3' | d8' | d10' |
|---|---|---|---|
| 50 | 5.13 | 196.06 | 3.50 |
| 100 | 107.18 | 77.31 | 20.20 |
| 225 | 190.25 | 11.44 | 3.00 |

If member III' remains fixed and member IV' is movable, the air spaces d3', d8', d10' and d12' will vary in accordance with the following Table E.

TABLE E

| f' | d3' | d8' | d10' | d12' |
|---|---|---|---|---|
| 50 | 5.13 | 196.06 | 3.50 | 16.12 |
| 100 | 110.87 | 90.31 | 16.50 | 3.13 |
| 200 | 190.18 | 11.00 | 3.12 | 16.51 |

It will be understood that the width of the prism V' is not critical in the system of Table C so that, particularly with fixed rear component IV' of the attachment, the space d12' will be substantially decreased (e.g., to the value given for space d10 in Table A) with a corresponding increase in the axial dimension of the prism; conversely, the prism may be omitted entirely if no reflex-type viewfinder is required. Moreover, as will be apparent from Table D, the varifocal range may be increased beyond the ratio of 4:1.

We claim:
1. An objective system comprising a principal objective and an attachment forwardly of said principal objective, said attachment consisting of four air-spaced components including an at most limitedly adjustable positive first component on the object side of the system, a negative second component following said first component, a negative third component following said second component, and a fixed positive fourth component following said third component and facing said principal objective; said negative second and third components being movable, relatively to each other and to said first and fourth components, into a first position in which the system has a relatively small focal length and a second position in which the system has a relatively large focal length; said second component having an individual focal length whose absolute value is less than that of the individual focal lengths of said first, third and fourth components and less than twice that of the focal length of said principal objective, said first component being a doublet with a convex forward face and a negatively refracting forwardly concave cemented surface having a radius of curvature whose absolute magnitude is less than 1.5 times that of the radius of said forward face, said second component including a doublet with a concave rear face and a positively refracting forwardly concave cemented surface having a radius of curvature whose absolute magnitude is less than 2.5 times that of the radius of said rear face, said principal objective consisting of four air-spaced singlets including two image-side lenses of opposite refractivity separated by an air space which is less than half the axial thickness of the negative one of said lenses; the separations $d3$, $d6$ and $d8$ each having a first value corresponding to said first position and a second value corresponding to said second position:

| Lens | Radii | Thicknesses and Separations | $n_d$ | $v$ |
|---|---|---|---|---|
| L1 | $r1=+275.13$ | $d1=58.75$ | 1.61772 | 49.78 |
| L2 | $r2=-355.69$ | $d2=8.75$ | 1.76180 | 26.98 |
|    | $r3=-3212.50$ | $d3=\begin{cases}6.15 \text{ (first position)} \\ 214.52 \text{ (second position)}\end{cases}$ | Air space | |
| L3 | $r4=-1821.25$ | $d4=22.50$ | 1.80518 | 25.46 |
| L4 | $r5=-217.00$ | $d5=7.50$ | 1.62041 | 60.29 |
|    | $r6=+102.06$ | $d6=\begin{cases}180.15 \text{ (first position)} \\ 12.90 \text{ (second position)}\end{cases}$ | Air space | |
| L5 | $r7=-142.56$ | $d7=6.25$ | 1.62004 | 36.34 |
|    | $r8=-3618.75$ | $d8=\begin{cases}68.14 \text{ (first position)} \\ 27.02 \text{ (second position)}\end{cases}$ | Air space | |
| L6 | $r9=+275.63$ | $d9=12.50$ | 1.52015 | 63.59 |
|    | $r10=-220.31$ | $d10+d11+d12=73.76$ | | |
| L7 | $r13=+124.00$ | $d13=13.75$ | 1.67790 | 55.52 |
|    | $r14=-473.63$ | $d14=0.25$ | Air space | |
| L8 | $r15=+56.31$ | $d15=14.88$ | 1.69680 | 55.61 |
|    | $r16=+85.50$ | $d16=7.50$ | Air space | |
| L9 | $r17=-177.50$ | $d17=19.69$ | 1.78470 | 26.10 |
|    | $r18=+46.84$ | $d18=8.13$ | Air space | |
| L10 | $r19=+93.00$ | $d19=14.38$ | 1.74400 | 44.90 |
|    | $r20=-71.94$ | | | |

2. An objective system comprising a principal objective and an attachment forwardly of said principal objective, said attachment consisting of four air-spaced components including an at most limitedly adjustable positive first component on the object side of the system, a movable negative second component following said first component, a negative third component following said second component, and a fixed positive fourth component following said third component and facing said principal objective; said negative second and third components being movable, relatively to each other and to said first and fourth components, into a first position in which the system has a relatively small focal length, a second position in which the system has a relatively large focal length, and a third position in which the system has an intermediate focal length; said second component having an individual focal length whose absolute value is less than that of the individual focal lengths of said first, third and fourth components and less than twice that of the focal length of said principal objective, said first component being a doublet with a convex forward face and a negatively refracting forwardly concave cemented surface having a radius of curvature whose absolute magnitude is less than 1.5 times that of the radius of said forward face, said second component including a doublet with a concave rear face and a positively refracting forwardly concave cemented surface having a radius of curvature whose absolute magnitude is less than 2.5 times that of the radius of said rear face, said principal objective consisting of four air-spaced singlets including two image-side lenses of opposite refractivity separated by an air space which is less than half the axial thickness of the negative one of said lenses; the lenses L1, L2 of said first component, the lenses L3 and L4 of said second component, said third component L5, said fourth component L6 and the four air-spaced singlets L7, L8, L9, L10 of said principal objective having radii $r1$ to $r10$, $r13$ to $r20$ and thicknesses and spacings $d1$ to $d19$ whose numerical values, based upon a numerical value of 100 for the mean focal length of the system, along with the refractive indices $n_d$ and the Abbé numbers $v$ of said components are substantially as given in the following table, the spacings $d3$, $d6$ and $d8$ being given for said third position:

| Lens | Radii | Thicknesses and Separations | $n_d$ | $v$ |
|---|---|---|---|---|
| L1 | $r1=+275.13$ | $d1=58.75$ | 1.61772 | 49.78 |
| L2 | $r2=-355.69$ | $d2=8.75$ | 1.76180 | 26.98 |
|    | $r3=-3212.50$ | $d3=127.19$ | Air space | |
| L3 | $r4=-1821.25$ | $d4=22.50$ | 1.80518 | 25.46 |
| L4 | $r5=-217.00$ | $d5=7.50$ | 1.62041 | 60.29 |
|    | $r6=+102.06$ | $d6=61.00$ | Air space | |
| L5 | $r7=-142.56$ | $d7=6.25$ | 1.62004 | 36.34 |
|    | $r8=-3618.75$ | $d8=66.25$ | Air space | |
| L6 | $r9=+275.63$ | $d9=12.50$ | 1.52015 | 63.59 |
|    | $r10=-220.31$ | $d10+d11+d12=73.76$ | | |
| L7 | $r13=+124.00$ | $d13=13.75$ | 1.67790 | 55.52 |
|    | $r14=-473.63$ | $d14=0.25$ | Air space | |
| L8 | $r15=+56.31$ | $d15=14.88$ | 1.69680 | 55.61 |
|    | $r16=+85.50$ | $d16=7.50$ | Air space | |
| L9 | $r17=-177.50$ | $d17=19.69$ | 1.78470 | 26.10 |
|    | $r18=+46.84$ | $d18=8.13$ | Air space | |
| L10 | $r19=+93.00$ | $d19=14.38$ | 1.74400 | 44.90 |
|    | $r20=-71.94$ | | | |

3. An objective system as defined in claim 2, further comprising a deflecting prism with plane forward and rear surfaces and with a refractive index $n_d$ of substantially 1.51680 and an Abbé number $v$ of substantially 64.20 interposed between said attachment and said principal objective with a separation $d10$ substantially equal to 3.13 from said fourth component L6 and with an axial thickness $d11$ substantially equal to 55.00.

4. An objective system comprising a principal objective and an attachment forwardly of said principal objective, said attachment consisting of four air-spaced components including an at most limitedly adjustable positive first component on the object side of the system, a negative second component following said first component, a negative third component following said second component, and a positive fourth component following said third component and facing said principal objective, said second component and one of the remaining components other than said first component being axially movable; said negative second and third components being movable, relatively to each other and to said first and fourth components, into a first position in which the system has a relatively small focal length, a second position in which the system has a relatively large focal length, and a third position in which the system has an intermediate focal length; said second component having an individual focal length $f_{II}'$ whose absolute value is less than that of the individual focal lengths $f_{I}'$, $f_{III}'$, $f_{IV}'$ of said first, third and fourth components and less than twice that of the focal length of said principal objective, said first component being a doublet with a convex forward face and a negatively refracting forwardly concave cemented surface having a radius of curvature whose absolute magnitude is less than 1.5 times that of the radius of said forward face, said second component including a doublet with a concave rear face and a positively refracting forwardly concave cemented surface having a radius of curvature whose absolute magnitude is less than 2.5 times that of the radius of said rear face, the absolute values of the focal lengths $f_{I}'$, $f_{III}'$, $f_{IV}'$ substantially satisfying the relationship $0.3|f_{I}'|<3(|f_{III}'|-f_{IV}'|)<1.3|f_{I}'|$; said third and fourth components each being a singlet, the radii $r1'$, $r2'$ of the front surface and the cemented surface of said first component substantially satisfying the relationship $+1.2r1'\geq-r2'$, said second component further including a biconcave singlet preceded by the doublet thereof, the radii $r7'$ and $r8'$ of the front and rear surfaces of said biconcave singlet substantially satisfying the relationship $10r8'\geq-r7'$.

5. An objective system comprising a principal objective and an attachment forwardly of said principal objective, said attachment consisting of four air-spaced components including an at most limitedly adjustable positive first component on the object side of the system, a negative second component following said first component, a negative third component following said second component, and a positive fourth component following said third component and facing said principal objective; said second component and one of the remaining components other than said first component being axially movable, relatively to each other and to the other two components, into a first position in which the system has a relatively small focal length, a second position in which the system has a relatively large focal length, and a third position in which the system has an intermediate focal length; said second component having an individual focal length $f_{II}'$ whose absolute value is less than that of the individual focal lengths $f_{I}'$, $f_{III}'$, $f_{IV}'$ of said first, third and fourth components and less than twice that of the focal length of said principal objective, said first component being a doublet with a convex forward face and a negatively refracting forwardly concave cemented surface having a radius of curvature whose absolute magnitude is less than 1.5 times that of the radius of said forward face, said second component including a doublet with a concave rear face and a positively refracting forwardly concave cemented surface having a radius of curvature whose absolute magnitude is less than 2.5 times that of the radius of said rear face, said principal objective consisting of four air-spaced singlets including two image-side lenses of opposite refractivity separated by an air space which is less than half the axial thickness of the negative one of said lenses, the absolute value of the focal lengths $f_{I}'$, $f_{III}'$, $f_{IV}'$ substantially satisfying the relationship $$0.3'|f_{I}'|<3(|f_{III}'|-_{IV}'|)<1.3|f_{I}'|$$

said third and fourth components each being a singlet, the radii $r1'$, $r2'$ of the front surface and the cemented surface of said first component substantially satisfying the relationship $+1.2r1'\geq-r2'$, said radii $r1'$, $r2'$ defining a lens with a refractive index $n_d$ greater than 1.65 said second component further including a biconcave singlet preceded by the doublet thereof, the radii $r7'$ and $r8'$ of the front and rear surfaces of said biconcave singlet substantially satisfying the relationship $10r8'\geq-r7'$.

6. An objective system as defined in claim 5 wherein the lenses L1', L2' of said first component, L3', L4' and L5' of said second component, said third component L6' said fourth component L7' and the four air-spaced singlets L8', L9', L10', L11' of said principal objective have radii $r1'$ to $r12'$, $r15'$ to $r22'$ and thicknesses and spacing $d1'$ to $d21'$ whose numeral values, based upon a numerical value of 100 for the intermediate focal length of the system, along with the refractive indices $n_d$ and the Abbé numbers $\nu$ of said components are substantially as given in the following table, the spacings $d3'$, $d8'$ and $d10'$ being given for said third position:

| Lens | Radii | Thicknesses and Separations | $n_d$ | $\nu$ |
| --- | --- | --- | --- | --- |
| L1' | $r1' = +275.13$ | $d1' = 54.38$ | 1.66672 | 48.38 |
| L2' | $r2' = -303.25$ | $d2' = 8.75$ | 1.80518 | 25.46 |
|  | $r3' = -1926.25$ | $d3' = 107.18$ | Air space | |
| L3' | $r4' = +3312.50$ | $d4' = 16.88$ | 1.80518 | 25.46 |
| L4' | $r5' = -241.75$ | $d5' = 5.94$ | 1.58913 | 61.24 |
|  | $r6' = +169.06$ | $d6' = 14.38$ | Air space | |
| L5' | $r7' = -531.88$ | $d7' = 6.25$ | 1.60311 | 60.68 |
|  | $r8' = +116.50$ | $d8' = 77.31$ | Air space | |
| L6' | $r9' = -76.69$ | $d9' = 6.25$ | 1.63636 | 35.35 |
|  | $r10' = -140.56$ | $d10' = 20.20$ | Air space | |
| L7' | $r11' = +625.25$ | $d11' = 12.50$ | 1.62230 | 53.14 |
|  | $r12' = -131.06$ | $d12'+d13'+d14'=72.56$ | | |
| L8' | $r15' = +121.19$ | $d15' = 13.75$ | 1.67790 | 55.52 |
|  | $r16' = -518.63$ | $d16' = 0.25$ | Air space | |
| L9' | $r17' = +56.31$ | $d17' = 14.88$ | 1.69350 | 53.39 |
|  | $r18' = +86.38$ | $d18' = 7.50$ | Air space | |
| L10' | $r19' = -186.81$ | $d19' = 19.69$ | 1.80518 | 25.46 |
|  | $r20' = +47.66$ | $d20' = 8.13$ | Air space | |
| L11' | $r21' = +93.00$ | $d21' = 14.38$ | 1.74400 | 44.90 |
|  | $r22' = -73.00$ | | | |

7. An objective system as defined in claim 6 wherein said third component is axially movable and said fourth component is fixed, further comprising a deflecting prism with plane forward and rear surfaces and with a refractive index $n_d$ of substantially 1.51680 and an Abbé number $\nu$ of substantially 64.20 interposed between said attachment and said principal objective with a separation $d12'$ substantially equal to 16.18 from said fourth component L7' and with an axial thickness $d13'$ substantially equal to 37.50.

8. An objective system as defined in claim 7 wherein the separations $d3'$, $d8'$ and $d10'$ have substantially the values 5.13, 196.06 and 3.50, respectively, in said first position and 190.25, 11.44 and 3.00, respectively in said second position.

9. An objective system as defined in claim 5 wherein the lenses L1', L2' of said first component, L3', L4' and L5' of said second component, said third component L6', said fourth component L7' and the four air-spaced singlets L8', L9', L10', L11' of said principal objective have radii $r1'$ to $r12'$, $r15'$ to $r22'$ and thicknesses and spacings $d1'$ to $d21'$ whose numerical values, based upon a numerical value of 100 for the intermediate focal length of the system, along with the refractive indices $n_d$ and the Abbé numbers $\nu$ of said components are substantially as given in the following table, the spacings $d3'$, $d8'$ and $d10'$ being given for said third position:

| Lens | Radii | Thicknesses and Separations | $n_d$ | $\nu$ |
|---|---|---|---|---|
| L1' | r1' = + 275.13 | d1' = 54.38 | 1.66672 | 48.38 |
| L2' | r2' = − 303.25 | d2' = 8.75 | 1.80518 | 25.46 |
|  | r3' = −1926.25 | d3' = 110.87 | Air space |  |
| L3' | r4' = +3312.50 | d4' = 16.88 | 1.80518 | 25.46 |
| L4' | r5' = − 241.75 | d5' = 5.94 | 1.58913 | 61.24 |
|  | r6' = + 169.06 | d6' = 14.38 | Air space |  |
| L5' | r7' = − 531.88 | d7' = 6.25 | 1.60311 | 60.68 |
|  | r8' = + 116.50 | d8' = 90.31 | Air space |  |
| L6' | r9' = − 76.69 | d9' = 6.25 | 1.63636 | 35.35 |
|  | r10' = − 140.56 | d10' = 16.50 | Air space |  |
| L7' | r11' = + 625.25 | d11' = 12.50 | 1.62230 | 53.14 |
|  | r12' = − 131.06 | d12'+d13'+d14'=59.57 |  |  |
| L8' | r15' = + 121.19 | d15' = 13.75 | 1.67790 | 55.52 |
|  | r16' = − 518.63 | d16' = 0.25 | Air space |  |
| L9' | r17' = + 56.31 | d17' = 14.88 | 1.69350 | 53.39 |
|  | r18' = + 86.38 | d18' = 7.50 | Air space |  |
| L10' | r19' = − 186.81 | d19' = 19.69 | 1.80518 | 25.46 |
|  | r20' = + 47.66 | d20' = 8.13 | Air space |  |
| L11' | r21' = + 93.00 | d21' = 14.38 | 1.74400 | 44.90 |
|  | r22' = − 73.00 |  |  |  |

10. An objective system as defined in claim 9 wherein said third component is fixed and said fourth component is axially movable, further comprising a deflecting prism with plane forward and rear surfaces and with a refractive index $n_d$ of substantially 1.51680 and an Abbé number $\nu$ of substantially 64.20 interposed between said attachment and said principal objective with a separation $d14'$ substantially equal to 18.94 from said principal objective and with an axial thickness $d13'$ substantially equal to 37.50.

11. An objective system as defined in claim 10 wherein the separations $d3'$, $d8'$, $d10'$ and $d12'$ have substantially the values 5.13, 196.06, 3.50 and 16.12, respectively, in said first position and 190.18, 11.00, 3.12 and 16.51, respectively, in said second position, the value of $d12'$ in said third position being substantially 3.13.

References Cited by the Examiner

UNITED STATES PATENTS

| | | | |
|---|---|---|---|
| 2,847,907 | 8/1958 | Angenieux | 88—57 |
| 3,027,805 | 4/1962 | Yamahi | 88—57 |
| 3,057,257 | 10/1962 | Klemt et al. | 88—57 |

JEWELL H. PEDERSEN, *Primary Examiner.*

JOHN K. CORBIN, *Examiner.*